United States Patent [19]

Kishino et al.

[11] 3,711,580

[45] Jan. 16, 1973

[54] O-CHLORO-SUBSTITUTED ALKYL-S-ALKYL-S-BENZYL-PHOSPHORO-DITHIOLATES

[75] Inventors: Shiego Kishino; Sadao Uchihira; Yoshio Kurahashi; Toyohiko Kume, all of Tokyo, Japan

[73] Assignee: Farbenfabriken Bayer Aktiengesellshaft, Leverkusen, Germany

[22] Filed: Dec. 4, 1969

[21] Appl. No.: 882,274

[30] Foreign Application Priority Data

Dec. 6, 1968 Japan...............................43/88959

[52] U.S. Cl.......................................260/963, 424/225
[51] Int. Cl..............................C07f 9/16, A01n 9/36

[58] Field of Search........................................260/963

[56] References Cited

FOREIGN PATENTS OR APPLICATIONS 6,717,383   6/1968   Netherlands........................260/963

*Primary Examiner*—Lewis Gotts
*Assistant Examiner*—Anton H. Sutto
*Attorney*—Burgess, Dinklage & Sprung

[57] ABSTRACT

O-chloro-substituted alkyl-S-alkyl-S-benzyl-phosphorodithiolates, i.e. O-chloro-substituted alkyl-S-alkyl-S-benzyl-dithiolphosphates, which possess fungicidal properties and which may be produced by conventional methods.

14 Claims, No Drawings

O-CHLORO-SUBSTITUTED ALKYL-S-ALKYL-S-BENZYL-PHOSPHORO-DITHIOLATES

The present invention relates to and has for its objects the provision for particular new O-chloro-substituted alkyl-S-alkyl-S-benzyl-phosphorodithiolates, i.e. O-chloro-substituted alkyl-S-alkyl-S-benzyl-dithiolphosphates, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

Heretofore, in controlling serious rice diseases such as rice blast (*Piricularia oryzae*) and sheath blight (*Pellicularia sasakii*), organic mercury compounds and organic arsenic compounds such as phenyl mercuric acetate, methyl arsonic acid salt, particularly methyl arsine-bis-dimethyl dithiocarbamate (A) — commonly known as Urbazid, etc., which contain heavy metals harmful to men and domestic animals, e.g., cattle, have been used widely, because they are excellent in their fungicidal effect and are comparatively economical to use. Recently, however, the use of organic mercuric compounds and organic arsenic compounds during the growing period of rice plants has been found objectionalbe from a public health standpoint because of the direct and indirect toxicity of these known compounds to mammals, especially humans, whereupon such use has been discouraged or prohibited altogether.

It is already known from Jap. Pat. Pub. No. Sho 42-3040 that O,O-diisopropyl-S-benzyl-phosphorothiolate (D) — commonly known as KITAZIN-P, possesses fungicidal activity. Analogous compounds, O-sec.-butyl-S-ethyl-S-benzyl-phosphorodithiolate(B) and O-sec.-butyl-S-methyl-S-benzyl-phorphorodithiolate(C) are also disclosed as fungicidal and insecticidal compounds in Netherlandish Pat. specification No. 67,17383. However, the fungicidal activity of these compounds is generally not as pronounced as in the case of the foregoing organic mercury compounds and organic arsenic compounds.

Accordingly, there is a strong demand for compounds which do not contain any heavy metals harmful to men and domestic animals, yet which are inexpensive and of sufficient fungicidal activity to combat effectively rice diseases.

It has now been found, in accordance with the present invention, that the particular new O-chloro-substituted alkyl-S-alkyl-S-benzyl-phosphorodithiolates of the formula

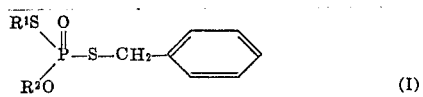

(I)

in which
R$^1$ is methyl or ethyl, and
R$^2$ is chloro-substituted alkyl of 3–4 carbon atoms having 1–2 chloro substituents,
exhibit strong fungicidal properties.

It has been furthermore found, in accordance with the present invention, that a process for the production of the particular new compounds of formula (I) above may be provided, which comprises reacting an O-chloro-substituted alkyl-S-alkyl-thiolphosphoryl chloride of the formula

(II)

in which
R$^1$ and R$^2$ are the same as defined above,
with benzyl mercaptan or benzyl mercaptide salt of the formula

(III)

in which
M is hydrogen or alkali metal, such as sodium, potassium, lithium, and the like, especially sodium.

Surprisingly, the particular new compounds of formula (I) above according to the present invention exhibit an excellent fungitoxic effectiveness, especially for agricultural and horticultural purposes, more especially against serious rice diseases, and a certain, though less active, insecticidal effectiveness, with a comparatively low mammalian toxicity and a concomitantly low phytotoxicity, whereas the known organic mercury and organic arsenic compounds, e.g. compound (A), used for these purposes as aforesaid are highly toxic to mammals, while the analogous S-benzyl-phosphorodithiolates (B) and (C) and -phosphorothiolate (D) are less effective as fungicides. Therefore, the instant compounds represent a valuable contribution to the art.

The general process for the preparation of the instant compounds is illustrated by the following reaction scheme:

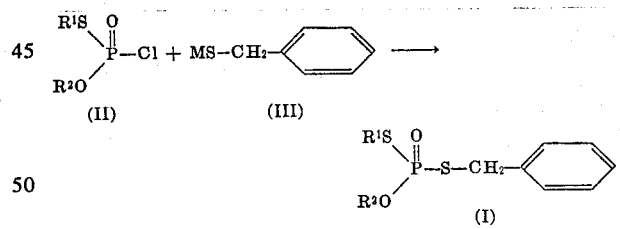

in which R$^1$, R$^2$ and M are the same as defined above.

The starting materials which may be used for producing the instant new compounds are already known and are clearly characterized by the formulas (II) and (III) noted above.

Advantageously, in accordance with the present invention, in the various formulas herein;
R$^1$ represents
methyl; and
ethyl; and
R$^2$ represents
chloro-substituted straight and branched chain alkyl of 3–4 carbon atoms having 1–2 chloro substituents such as mono and di chloro-substituted n- and iso-propyl, n-, iso-, sec.- and tert.- butyl, and the like, especially mono and di chloro-substituted n- and iso-propyl, n-, iso- and sec.-butyl, and more especially 1-methyl-2-chloro-ethyl, 1-chloromethyl-2-chloro-ethyl, 1-methyl-2-chloro-propyl, 1methyl-3-chloropropyl, 4-chloro-butyl-, and the like.

Preferably, $R^1$ is methyl; or ethyl; and $R^2$ is mono or di chloro-substituted n- or iso-propyl, or n-, iso- or sec.-butyl.

In particular, $R^1$ is methyl; or ethyl; and $R^2$ is 1-methyl-2-chloro-ethyl, 1-chloromethyl-2-chloro-ethyl, 1-methyl-2-chloro-propyl, 1-methyl-3-chloro-propyl, 4-chloro-butyl.

More especially, $R^1$ is methyl; or ethyl; and $R^2$ is mono chloro-substituted alkyl of 3–4 carbon atoms.

As examples of thiolphosphoryl chlorides of formula (II) above which may be used as starting materials, there are mentioned:

O-(mono and di chloro-substituted n-propyl, isopropyl, n-butyl, isobutyl, sec.-butyl and tert.-butyl)-S-(methyl and ethyl)-thiolphosphoryl chlorides, and the like, especially O-(1-methyl-2-chloroethyl-), O-(1-chloromethyl-2-chloro-ethyl-), O-(1-methyl-2-chloropropyl), O-(1-methyl-3-chloro-propyl), O-(4-chloro-butyl-), and the like, —S—(methyl and ethyl)-thiolphosphoryl chlorides, etc.

As examples of corresponding benzyl mercaptide alkali metal salts of formula (III) above;; i.e., in addition to benzyl mercaptan per se, which may be used as starting materials, there are mentioned: sodium, potassium and lithium benzyl mercaptide, and the like.

The production process is preferably carried out in the presence of inert solvents (the term solvent including mere diluents). Suitable inert organic solvents usable for carrying out the production process in this regard include hydrocarbons, such as benzene and benzine; chlorinated hydrocarbons, such as methylene chloride, ethylene chloride, carbon tetrachloride and dichlorobenzene; ethers, such as diethyl ether, dibutyl ether and dioxan; ketones, such as acetone, cyclohexanone and methylethyl ketone; and acetonitrile and dimethyl formamide; and the like.

A basic substance, preferably an alkali metal hydroxide, carbonate or bicarbonate, such as sodium or potassium hydroxide, carbonate and bicarbonate, nd the like, or a tertiary organic base, i.e., a tertiary amine, such as triethylamine, pyridine, dimethyl-cyclohexylamine, dimethylaniline, dimethylbenzylamine, and the like, is advantageously employed as inorganic or organic acid binding agent where the corresponding free starting benzyl mercaptan is used.

The reaction temperature can be varied within a fairly wide range. In general, the reaction is carried out at substantially between about 0°–100°C, and preferably between about 0°–80°C.

When carrying out the production process, approximately equimolar amounts of the starting reactants are used, but an excess of the acid binding agent is not harmful, i.e. where the free benzyl mercaptan is used. An inert organic solvent, e.g., benzene or a ketone, may be employed and the reaction may be carried out, for example, in triethylamine as acid binding agent when the free benzyl mercaptan is used, at a temperature of about 60°–80°C, by dissolving the free benzyl mercaptan and triethylamine, or the corresponding alkali metal benzyl mercaptide, as the case may be, in benzene and adding the thiolphosphoryl chloride dropwise thereto. After completion of the reaction (about 1–10 hours), the reaction mixture may be worked up in the usual manner, such as by filtering off the precipitated acid binding agent or alkali metal chloride, as the case may be, washing the reaction mixture with aqueous sodium carbonate solution and thereafter with water, then drying with anhydrous sodium sulfate, and distilling off the benzene. The residue is in most cases a colorless or slightly yellow colored distillable oil which is soluble in organic solvents and only difficultly soluble in water.

Advantageously, the particular new compounds according to the present invention exhibit strong fungitoxic activity and are distinguished by a broad spectrum of activity. Their low toxicity to warm-blooded animals and their good compatibility with higher plants permits the instant active compounds to be used as plant protection agents against fungal plant diseases. In the concentration normally used for the control of fungi, the instant compounds do not damage cultivated plants.

Fungitoxic agents, such as the instant compounds, are usable in plant protection, i.e., agricultural and horticultural endeavors, for the control of fungi from the most diverse classes of fungi, such as Archimycetes, *Ascomycetes Phycomycetes*, Basidiomycetes and *Fungi Imperfecti*.

The active compounds according to the present invention can be used for example against parasitic fungi, on above-the-soil parts of plants, fungi which cause tracheomycosis which attack the plant from the soil, seed-borne fungi and soil-inhabiting fungi.

By reason of their excellent properties mentioned above, the active compounds according to the present invention can also be used with good results against fungal diseases which hitherto had to be controlled with fungicidal agents containing heavy metals harmful to man and domestic animals, e.g., arsenic and mercury.

The instant active compounds have given particularly good results in the control of serious rice diseases including not only rice blast and brown spot, but also sheath blight. Thus, the instant compounds show an excellent preventative as well as curative activity against the fungi *Piricularia oryzae* (i.e. blast), *Cochliobolus miyabeanus* (i.e., helminthosporium leaf spot or brown spot) and *Pellicularia sasakii* (i.e., sheath blight) as well as against the fungi *Alternaria kikuchiana* (black spot on pear), *Elsinoe fawcetti* (scab on orange), *Botrytis cinerea* (gray mold on vegetables), and the like.

The active compounds according to the instant invention can be utilized, if desired, in the form of the usual formulations or compositions with conventional inert (i.e., plant compatible or herbicidally inert) pesticide diluents or extenders, (i.e. diluents or extenders of the type usable in conventional pesticide formulations or compositions, e.g., conventional pesticide dispersible carrier vehicles, such as solutions, emulsions, suspensions, emulsifiable concentrates, spray powders, oils, pastes, soluble powders, dusting agents, granules, tablets, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and non-solvents, such as aromatic hydrocarbons (e.g., benzene, toluene, xylene, dimethyl naphthalene, aromatic naphthas, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g. dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, diatomaceous earth, clay, montmorillonite, etc.), and ground synthetic minerals (e.g., highly dispersed silicic acid, silicates, e.g., alkali silicates, etc.); whereas the following may be chiefly considered for use as conventional carrier vehicle assistants, e.g. surface-active agents, for this purpose: emulsifying or wetting agents, such as non-ionic and/or anionic emulsifying or wetting agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, acaricides, nematocides, bactericides, etc., including, especially fungicidal, organophosphorus compounds, carbamate compounds, dithiocarbamate compounds, chlorine compounds, dinitro compounds, organic sulfur or copper compounds, substituted phenoxy compounds, chlorophenols, substituted diphenyl ethers, anilide compounds, ureas, triazines, antibiotics, spreaders, fixing agents, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.001–10 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally about 0.001–95 percent, and preferably 0.01–95 percent, by weight of the mixture.

Generally, the active compound is used in dosage amounts per unit area of substantially between about 15–1,000 g, preferably 40–600 g, and most preferably 40–100 g, per 10 ares, irrespective of the presence or absence of such carrier vehicle.

The active compounds can also be used in accordance with the well-known ultra-low volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound, or even the 100 percent active substance alone, e.g., about 20–100 percent by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering,, dusting, watering, sprinkling, pouring, dressing, via incrustation, and the like.

Significantly, the fungicidal compositions of the present invention can be applied for example by spraying a dust or powder formulation directly onto stems and leaves of plants; or by using the formulation as a seed-dressing; by spraying an emulsifiable concentrate, diluted with water, etc. to a desirable concentration, onto stems and leaves of plants; by suspending a wettable powder in water at a desirable concentration and spraying the formulation onto stems and leaves of plants; by applying granule formulations directly to the soil; and the like.

Furthermore, the active compounds can be applied advantageously to the water surface of a rice paddy field, after dilution if desired, irrespective of whether or not they are in the form of dust, wettable powder, emulsion or granule preparations.

It will be realized, of course, that the concentration of the particular active compound utilized in admixture with the carrier vehicle will depend upon the intended application, the purpose for which the active compound is used, and the like. Therefore, in special cases, it is possible to go above or below the aforementioned concentration ranges and dosage amounts per unit area.

The following illustrate, without limitation, examples of formulations which may be used in accordance with the present invention:

FORMULATION A 15 parts by weight of instant compound (5), 80 parts by weight of a mixture of diatomaceous earth and kaolin (1:5) and 5 parts by weight of the emulsifier Runox (trade name of the product of Toho Kagaku Kogyo K.K., Japan: polyoxyethylene alkylaryl ether) are pulverized and mixed to form a wettable powder. It is applied by spraying after dilution with water at the concentration of 1 to 300–500 to fungi and/or their habitat.

FORMULATION B 30 parts by weight of instant compound (2), 30 parts by weight of xylene and 30 parts by weight of Kawakazol (trade name of the product of Kawasaki Kasei Kogyo K.K., Japan: aromatic hydrocarbons of higher boiling point) and 10 parts by weight of the emulsifier Sorpol (trade name of the product of Toho Kagaku Kogyo K.K., Japan: polyoxyethylene alkylaryl ether) are mixed and stirred to form an emulsifiable concentrate. It is applied by spraying after dilution with water at the concentration of 1 to 1,000 to fungi and/or their habitat.

FORMULATION C 2 parts by weight of instant compound (1) and 98 parts by weight of a mixture of talc and clay (3:1) are pulverized and mixed to form a dust or powder. It is applied by dusting directly to fungi and/or their habitat.

FORMULATION D 1.5 parts by weight of instant compound (1), 2.0 parts by weight of O,O-dimethyl-O-(3-methyl-4-methylmercapto-phenyl)-phosphorothiolate, and 96.5 parts of a mixture of talc and clay (3:1) are pulverized and mixed to form a dust. It is applied by dusting directly to fungi and/or their habitat.

The fungicidal effectiveness of the particular new compounds of the present invention is illustrated, without limitation, by the following examples:

EXAMPLE 1

Test on rice blast (Piricularia oryzae): Pot test a. Test of Preventive Effect

Rice plants (Jukkoku variety) are grown in pots each having a diameter of 12 cm. In the offshoot stage, such plants are sprayed (treated) with a diluted liquid composition containing correspondingly the particular active compound, such liquid composition being of the type described in Formulation (B) noted above. The spraying is effected by putting the pots on a turntable moving in conjunction with the discharge of the composition from spray nozzles, and spraying such composition in an amount of 50 ml per 3 pots at a pressure of 1.5 $Kg/cm^2$ until the leaves are thoroughly wetted therewith.

For the next 2 days, the treated pots are placed in a humid chamber at 25°C. and a relative atmospheric humidity of 100 percent. Twice during this time, such plants are inoculated by spraying with a suspension of cultured spores of Piricularia oryzae.

Seven days after inoculation, the degree of infestation is determined by applying a scale ranging from 0 to 5, and a control value of each particular active compound against the rice blast is determined in accordance with the following relationship:

| Degree of infestation | Percentage of diseased spots |
|---|---|
| 0 | 0 |
| 0.5 | 2 or less |
| 1 | 3–5 |
| 2 | 6–10 |
| 3 | 11–20 |
| 4 | 21–40 |
| 5 | 41 or more |

$$\text{Control value} = \frac{\left(\begin{array}{c}\text{Degree of infestation} \\ \text{in non-treated area}\end{array}\right) - \left(\begin{array}{c}\text{Degree of infestation} \\ \text{in treated area}\end{array}\right)}{\text{Degree of infestation in treated area}} \times 100$$

b. Test of Curative Effect

This test is conducted in order to determine the curative action of the particular active compounds on fungi already introduced onto plants. The same type rice plants as in the above-mentioned preventive effect test are placed for 2 days in a humid chamber a 25°C and a relative atmospheric humidity of 100 percent. During this period, such plants are inoculated by spraying with a suspension of cultured spores of Piricularia oryzae. On the next day, a diluted liquid composition containing correspondingly a predetermined concentration of the particular active compound as noted above is sprayed onto the pot-grown rice plants inn the same manner as in test (a).

Six days after spraying, the degree of infestation for each pot is determine in the same way, and the control value is also similarly calculated. At the same time, the phytotoxicity against rice plants is determined.

The particular active compounds tested, their concentrations and the results obtained can be seen from the following Table 1:

TABLE 1.—PREVENTIVE AND CURATIVE FUNGICIDAL EFFECT AGAINST RICE BLAST

| | Concentration of active compound in p.p.m. | Preventive test | | Curative test | | Phytotoxicity |
|---|---|---|---|---|---|---|
| | | Degree of infestation | Control value | Degree of infestation | Control value | |
| Active compound No. (see Table 4): | | | | | | |
| (1₁) | 250 | 0.15 | 97 | 1.65 | 67 | — |
| | 500 | 0 | 100 | 0.65 | 87 | — |
| (2₁) | 250 | 0.35 | 93 | 0.85 | 83 | — |
| | 500 | 0 | 100 | 0.35 | 93 | — |
| (3₁) | 250 | 1.15 | 77 | 3.35 | 33 | — |
| | 500 | 0.5 | 90 | 2.35 | 53 | — |
| (4₁) | 250 | 1.0 | 80 | 1.65 | 67 | — |
| | 500 | 0.65 | 87 | 0.5 | 90 | — |

TABLE 1.—Continued

| | Concentration of active compound in p.p.m. | Preventive test | | Curative test | | Phytotoxicity |
|---|---|---|---|---|---|---|
| | | Degree of infestation | Control value | Degree of infestation | Control value | |
| ($5_1$) | 250 | 1.65 | 67 | 2.0 | 60 | — |
| | 500 | 0.35 | 93 | 0.65 | 87 | — |
| ($6_1$) | 250 | 1.0 | 80 | 2.35 | 53 | — |
| | 500 | 0.5 | 90 | 1.0 | 80 | — |
| ($7_1$) | 250 | 1.0 | 80 | 2.0 | 60 | — |
| | 500 | 0.5 | 90 | 1.0 | 80 | — |
| ($8_1$) | 250 | 0.65 | 87 | 1.0 | 80 | — |
| | 500 | 0.15 | 97 | 0.65 | 87 | — |
| ($9_1$) | 250 | 1.0 | 80 | 1.65 | 67 | — |
| | 500 | 0.35 | 93 | 0.5 | 90 | — |
| ($10_1$) | 250 | 1.15 | 77 | 2.35 | 53 | — |
| | 500 | 0.5 | 90 | 1.0 | 80 | — |
| Known compound (comparison): | | | | | | |
| (B) 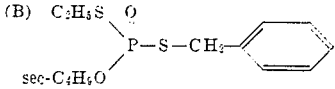 | 250 | 3.65 | 27 | 4.0 | 20 | — |
| | 500 | 2.35 | 53 | 3.35 | 33 | — |
| (C) 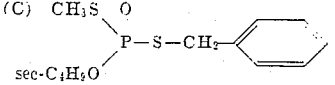 | 250 | 3.35 | 33 | 5.0 | 0 | — |
| | 500 | 2.0 | 60 | 3.65 | 27 | — |
| (D) 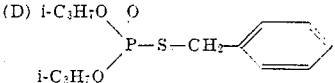 | 250 | 3.5 | 30 | 2.15 | 57 | — |
| | 500 | 2.35 | 53 | 0.65 | 87 | — |
| Non-treated control | | 5.0 | 0 | 5.0 | 0 | — |

NOTES: (1) The degree of infestation is an average value for the three pots per test. (2) Phytotoxicity: The symbol (—) indicates there is no bad effect on the growth of rice plants.

EXAMPLE 2

Test on sheath blight of rice plants (*Pellicularia sasakii*)

Rice plants (Kinmaze variety) are grown in unglazed pots each having a diameter of 12 cm. In the early stage of offshoot a diluted liquid composition of the particular active compound of the type described in Example 1 is sprayed onto the test plants.

On the next day, the sclerotium of Pellicularia sasakii, obtained by culturing for 10 days in a wheat culture medium, is inoculated onto the roots of the rice plants. The plants are then maintained for 8 days in an inoculating chamber at 28°–30°C at a relative atmospheric humidity of 95 percent or more. The degree of infestation is then determined.

The degree of infestation is expressed on the following basis, and the control value of each compound is calculated in accordance with the following relationship:

Degree of infestation = $[(3n_3 + 2n_2 + n_1 + 0n_0)/3 N] \times 100$ wherein
$N$ = the number of the total stems examined
$n_0$ = the number of non-infested stems
$n_1$ = the number of stems infested up to the first lead (from the bottom)
$n_2$ = the number of stems infested up to the second leaf
$n_3$ = the number of stems infested up to and above the third leaf Control value = $\dfrac{\left(\begin{array}{c}\text{Degree of infestation}\\ \text{in non-treated area}\end{array}\right) - \left(\begin{array}{c}\text{Degree of infestation in treated area}\end{array}\right)}{\text{Degree of infestation in non-treated area}}$

TABLE 2

Fungicidal Effect Against Sheath Blight off Rice Plants

| Active compound No. (see Table 4) | Concentration of active compound in ppm | Degree of infestation | Control value |
|---|---|---|---|
| ($1_2$) | 500 | 4.7 | 90 |
| ($2_2$) | 500 | 8.3 | 83 |
| ($3_2$) | 500 | 11.2 | 77 |
| ($4_2$) | 500 | 19.2 | 60 |
| ($5_2$) | 500 | 10.4 | 78 |
| ($6_2$) | 500 | 12.6 | 74 |
| ($7_2$) | 500 | 9.3 | 80 |
| ($8_2$) | 500 | 7.7 | 84 |
| ($9_2$) | 500 | 6.2 | 87 |
| ($10_2$) | 500 | 15.4 | 68 |
| Known compound (Comparison) | | | |
| (B) 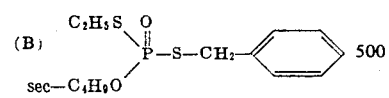 | 500 | 36.8 | 224 |
| (D) 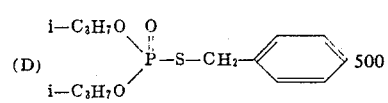 | 500 | 41.4 | 14 |
| Methylarsine-bis-(A) dimethyldithiocarbamate | 0.08 | 5.6 | 88 |
| Non-treated control | - | 48.0 | 0 |

Note: Degree of infestation is an average value for the three pots per test.

EXAMPLE 3

Test against plant pathogenic fungi (Agar dilution method)

The particular active compound is mixed into a potato agar culture medium to form the desired concentration of active compound therein. After the so-treated medium is poured into Petri dishes of 9 cm in diameter and coagulated, the same are inoculated with the corresponding plant pathogens. Control Petri dishes to which the active compound preparations are not added are also set up. After having been cultured at 27°C for 4 days, the growth condition of the plant pathogens is investigated and determined by a scale of 0 (no infestation) to 5 (infestation exactly the same as in the untreated control).

The particular active compounds tested, their concentration and the results obtained can be seen from the following Table 3.

tan are suspended in 200 ml. of benzene, and while the suspension is being vigorously stirred with cooling, 26 g (0.1 mol) of O-(1-chloromethyl-2-chloro-ethyl)-S-methyl-phosphorothiolate chloride are added dropwise. The bath temperature is gradually raised and the mixture is stirred at 70°C for 3 hours to complete the reaction. The precipitated inorganic salt is separated by filtration, and washed with a 1 percent aqueous sodium carbonate solution and water, followed by dehydration with anhydrous sodium sulfate. Benzene is removed by TABLE 3.—FUNGICIDAL EFFECT AGAINST VARIOUS PLANT PATHOGENIC FUNGI
(Agar Dilution Method)

| | Concentration of active compound in p.p.m. | Piricularia oryzae on rice | Cochliobolus miyabeanus on rice | Alternaria kikuchiana on pear | Elsinoe fawcetti on orange | Botrytis cinerea on vegetables |
|---|---|---|---|---|---|---|
| Active compound No. (see Table 4): | | | | | | |
| ($1_3$) | 31.3 | 0 | 2.3 | 3.0 | 1.0 | 0.5 |
| | 125.0 | 0 | 2.0 | 2.5 | 0 | 0 |
| | 500.0 | 0 | 1.0 | 0.5 | 0 | 0 |
| ($4_3$) | 31.3 | 0 | 4.0 | 3.0 | 1.5 | 2.0 |
| | 125.0 | 0 | 4.0 | 2.0 | 1.0 | 2.0 |
| | 500.0 | 0 | 2.0 | 1.0 | 0.7 | 1.0 |
| ($8_3$) | 31.3 | 0 | 3.5 | 3.0 | 1.5 | 0.8 |
| | 125.0 | 0 | 2.5 | 2.1 | 0 | 0 |
| | 500.0 | 0 | 1.0 | 0.7 | 0 | 0 |
| Known compound (comparison): (C) 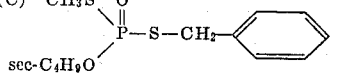 | 31.3 | 1.0 | 5.0 | | 2.0 | 1.5 |
| | 125.0 | 0 | 4.0 | | 0.7 | 0.7 |
| | 500.0 | 0 | 2.0 | | 0 | 0.2 |
| Non-treated control | | 5.0 | 5.0 | 5.0 | 5.0 | 5.0 |

The following further examples illustrate, without limitation, the process for producing the particular new compounds of the present invention.

EXAMPLE 4

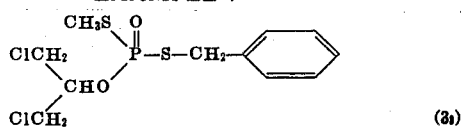

14.6 g (0.1 mol) of the sodium salt of benzylmercapdistillation. Distillation of the residue yields 25 g of O-(1-chloromethyl-2-chloro-ethyl)-S-methyl-S-benzyl-phosphoro dithiolate, i.e. O-(1,3-dichloroprop-2-yl)-S-methyl-S-benzyl-dithiolphosphate; [$n_D^{20}$ 1.5842], b.p. 160°C at 0.05 mm Hg.

The following Table 4 illustrates appropriate data for typical compounds according to the present invention.

TABLE 4

| Compound No. | Structural formula | Physical property |
|---|---|---|
| ($1_4$) | 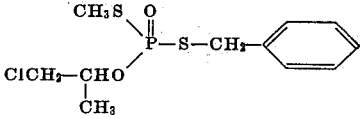 | B.P. 170° C./0.05 mm. Hg, $n_D^{20}$ 1.5727. |
| ($2_3$) | 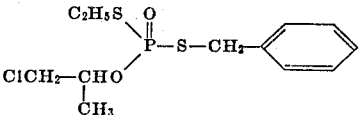 | B.P. 159–161° C./0.05 mm. Hg, $n_D^{20}$ 1.5663. |
| ($3_4$) | 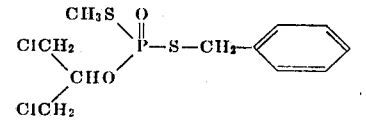 | B.P. 160° C./0.05 mm. Hg, $n_D^{20}$ 1.5842. |
| ($4_4$) | 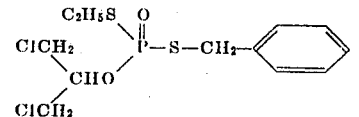 | B.P. 168.5° C./0.05 mm. Hg, $n_D^{20}$ 1.5773. |
| ($5_3$) | 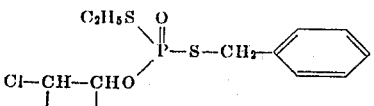 | B.P. 165° C./0.3 mm. Hg, $n_D^{20}$ 1.5622. |

TABLE 4.—Continued

| Compound No. | Structural formula | Physical property |
| --- | --- | --- |
| (6₃) | C₂H₅S\P(=O)(−S−CH₂−C₆H₅)/O−CH(CH₃)−CH₂−CH₂−Cl | $n_D^{20}$ 1.5633. |
| (7₃) | CH₃S\P(=O)(−S−CH₂−C₆H₅)/O−CH(CH₃)−CH(CH₃)−Cl | B.P. 156–160° C./0.15 mm. Hg, $n_D^{20}$ 1.5671. |
| (8₃) | CH₃S\P(=O)(−S−CH₂−C₆H₅)/O−CH(CH₃)−CH₂−CH₂−Cl | $n_D^{20}$ 1.5664. |
| (9₃) | CH₃S\P(=O)(−S−CH₂−C₆H₅)/O−CH₂CH₂CH₂CH₂−Cl | B.P. 140° C./0.1 mm. Hg, $n_D^{20}$ 1.5590. |
| (10₃) | C₂H₅S\P(=O)(−S−CH₂−C₆H₅)/O−CH₂CH₂CH₂CH₂−Cl | B.P. 140–142° C./0.1 mm. Hg, $n_D^{20}$ 1.5536. |

These compounds may be designated:
1. O-(1-methyl-2-chloro-ethyl)-S-methyl-S-benzyl-phosphorodithiolate
2. O-(1-methyl-2-chloro-ethyl)-S-ethyl-S-benzyl-phosphorodithiolate
3. O-(1-chloromethyl-2-chloro-ethyl)-S-methyl-S-benzylphosphorodithiolate
4. O-(1-chloromethyl-2-chloro-ethyl)-S-ethyl-S-benzylphosphorodithiolate
5. O-(1-methyl-2-chloro-propyl)-S-ethyl-S-benzyl-phosphorodithiolate
6. O-(1-methyl-3-chloro-propyl)-S-ethyl-S-benzyl-phosphorodithiolate
7. O-(1-methyl-2-chloro-propyl)-S-methyl-S-benzyl-phosphorodithiolate
8. O-(1-methyl-3-chloro-propyl)-S-methyl-S-benzyl-phosphorodithiolate
9. O-(4-chloro-butyl)S-methyl-S-benzyl-phsophorodithiolate
10. O-(4-chloro-butyl)-S-ethyl-S-benzyl-phosphorodithiolate It will be realized by the artisan that all of the foregoing compounds contamplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Phosphorodithiolate of the formula

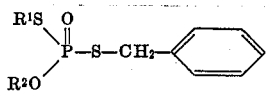

in which R¹ is selected from the group consisting of methyl and ethyl, and R² is chloro-substituted alkyl of 3–4 carbon atoms having 1–2 chlorosubstituents.

2. Compound according to claim 1 wherein R¹ is selected from the group consisting of methyl and ethyl, and R² is selected from the group consisting of mono and di chloro-substituted n-propyl, isopropyl, n-butyl, isobutyl and sec.-butyl.

3. Compound according to claim 1 wherein R¹ is selected from the group consisting of methyl and ethyl, and R² is selected from the group consisting of 1-methyl-2-chloro-ethyl, 1-chloromethyl-2-chloro-ethyl, 1-methyl-2-chloro-propyl, 1-methyl-3-chloro-propyl and 4-chloro-butyl.

4. Compound according to claim 1 wherein R¹ is selected from the group consisting of methyl and ethyl, and R² is selected from the group consisting of mono chloro-substituted alkyl of 3–4 carbon atoms.

5. Compound according to claim 1 wherein such compound is O-(1-methyl-2-chloro-ethyl)-S-methyl-S-benzyl-phosphoro-dithiolate of the formula

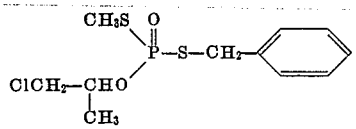

6. Compound according to claim 1 wherein such compound is O-(1-methyl-2-chloro-ethyl)-S-ethyl-S-benzyl-phosphorodithiolate of the formula

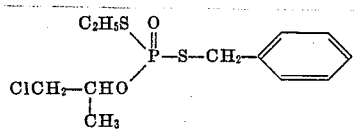

7. Compound according to claim 1 wherein such compound is O-(1-chloromethyl-2-chloro-ethyl)-S-methyl-S-benzyl-phosphorodithiolate of the formula

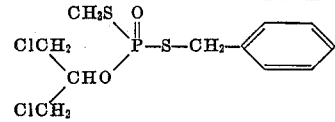

8. Compound according to claim 1 wherein such compound is O-(1-chloromethyl-2-chloro-ethyl)-S-ethyl-S-benzyl-phosphorodithiolate of the formula

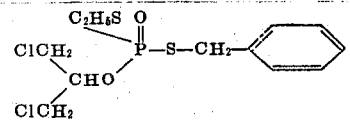

9. Compound according to claim 1 wherein such compound is O-(1-methyl-2-chloro-propyl)-S-methyl-S-benzyl-phosphorodithiolate of the formula

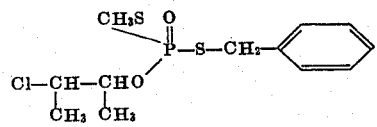

10. Compound according to claim 1 wherein such compound is O-(1-methyl-2-chloro-propyl)-S-ethyl-S-benzyl-phosphorodithiolate of the formula

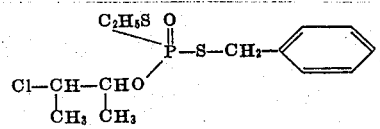

11. Compound according to claim 1 wherein such compound is O-(1-methyl-3-chloro-propyl)-S-methyl-S-benzyl-phosphorodithiolate of the formula

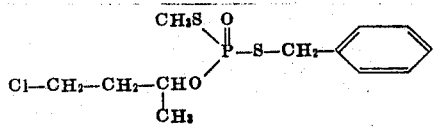

12. Compound according to claim 1 wherein such compound is O-(1-methyl-3-chloro-propyl)-S-ethyl-S-benzyl-phosphorodithiolate of the formula

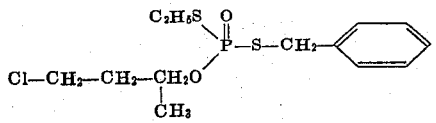

13. Compound according to claim 1 wherein such compound is O-(4-chloro-butyl)-S-methyl-S-benzyl-phosphorodithiolate of the formula

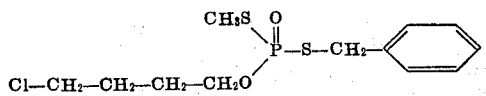

14. Compound according to claim 1 wherein such compound is O-(4-chloro-butyl)-S-ethyl-S-benzyl-phosphorodithiolate of the formula

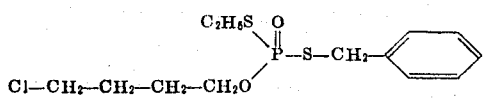

* * * * *